(12) United States Patent
Mendez

(10) Patent No.: US 8,671,516 B1
(45) Date of Patent: Mar. 18, 2014

(54) GAS-POWERED DUAL-HOSED BLOWER

(76) Inventor: Adelmo Mendez, Davie, FL (US)

( * ) Notice: Subject to any disclaimer, the term of this patent is extended or adjusted under 35 U.S.C. 154(b) by 393 days.

(21) Appl. No.: 13/205,698

(22) Filed: Aug. 9, 2011

(51) Int. Cl.
*A47L 5/14* (2006.01)

(52) U.S. Cl.
USPC ............................... 15/405; 15/327.5; 15/410

(58) Field of Classification Search
USPC .................. 15/327.5, 405, 344, 410
See application file for complete search history.

(56) References Cited

U.S. PATENT DOCUMENTS

| | | | |
|---|---|---|---|
| 5,813,088 A * | 9/1998 | Wagner et al. | 15/327.5 |
| 6,253,415 B1 * | 7/2001 | Honda | 15/339 |
| 6,928,693 B1 | 8/2005 | Ericson | |
| 7,140,449 B1 | 11/2006 | Ebner | |
| 7,437,796 B2 | 10/2008 | Rappin | |
| 7,600,290 B1 | 10/2009 | Peters | |
| D604,917 S | 11/2009 | Tinius | |
| 7,766,256 B2 * | 8/2010 | Loaces | 239/154 |
| 7,866,571 B2 * | 1/2011 | Muller et al. | 239/154 |
| 8,042,220 B2 * | 10/2011 | Hittmann et al. | 15/327.5 |
| 8,177,914 B2 * | 5/2012 | Peters | 134/25.1 |

* cited by examiner

*Primary Examiner* — Dung Van Nguyen
(74) *Attorney, Agent, or Firm* — Kyle Fletcher

(57) ABSTRACT

The gas-powered dual-hosed blower features two discharge tubes that are each outfitted with a valve that provides for independent adjustment of air speed therefrom. The two discharge tubes have full flexibility, which is associated with backpack blowers so that an end user may direct the air flow in a multitude of directions while simultaneously enabling the end user to adjust the air speed of each discharge tube independently. The valves for each discharge tube are positioned adjacent the blower, and are manipulated by a control stick located on the respective discharge tube. One of the control sticks includes a throttle, which enables adjustment of the engine speed therefrom.

19 Claims, 3 Drawing Sheets

GAS-POWERED DUAL-HOSED BLOWER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of gas-powered blowers, more specifically, a gas-powered blower featuring two hoses that can work independently.

B. Discussion of the Prior Art

As a preliminary note, it should be stated that there is an ample amount of prior art that deals with dual-hosed blowers and gas-powered blowers generally. As will be discussed immediately below, no prior art discloses a gas-powered, backpack blower that features two discharge tubes that can operate independent of one another; wherein each discharge tube features a control stick that can adjust a valve that is located upstream of said discharge tube and in which the valve is adjacent the blower; wherein each discharge tube may be adjusted to independently set the output air speed; wherein one of the control sticks includes a throttle to adjust the engine speed.

The Peters Patent (U.S. Pat. No. 7,600,290) discloses a backpack multiblower machine wherein one person manipulates two separate air discharge tubes in either different or unified positions simultaneously at debris. However, the discharge tubes are not capable of independent adjustment of their respective air speeds as is the current embodiment of the present application.

The Ericson Patent (U.S. Pat. No. 6,928,693) discloses a backpack blower that has a lightweight engine, a starter, a fuel tank, a fan, a frame for the engine, two hollow tubes, and control mechanism upon one tube. Again, the backpack blower does not enable each tube to independently adjust the air speeds of each tube independent of one another.

The Wagner et al. Patent (U.S. Pat. No. 5,813,088) discloses a backpack blower that includes a control handle carried by a flexible arm that permits the control handle to be positioned at any location in a three dimensional position range. However, the backpack blower is not directed for use with multiple discharge tubes.

The Rappin Patent (U.S. Pat. No. 7,437,796) discloses a backpack frame for a power blower and yard treatment sprayer system. Again, the power blower does not feature two independently adjustable discharge tubes.

The Ebner Patent (U.S. Pat. No. 7,140,449) discloses an air blower for extinguishing fires and method for extinguishing fires. Again, the air blower is not capable of operating two discharge tubes in which each tube can adjust the air flow therefrom independently of the opposing discharge tube.

While the above-described devices fulfill their respective and particular objects and requirements, they do not describe gas-powered, backpack blower that features two discharge tubes that can operate independent of one another; wherein each discharge tube features a control stick that can adjust a valve that is located upstream of said discharge tube and in which the valve is adjacent the blower; wherein each discharge tube may be adjusted to independently set the output air speed; wherein one of the control sticks includes a throttle to adjust the engine speed. In this regard, the gas-powered dual-hosed blower departs from the conventional concepts and designs of the prior art.

SUMMARY OF THE INVENTION

The gas-powered dual-hosed blower features two discharge tubes that are each outfitted with a valve that provides for independent adjustment of air speed therefrom. The two discharge tubes have full flexibility, which is associated with backpack blowers so that an end user may direct the air flow in a multitude of directions while simultaneously enabling the end user to adjust the air speed of each discharge tube independently. The valves for each discharge tube are positioned adjacent the blower, and are manipulated by a control stick located on the respective discharge tube. One of the control sticks includes a throttle, which enables adjustment of the engine speed therefrom.

An object of the invention is to provide a backpack-styled blower with two discharge tubes that can operate independent of one another.

A further object of the invention is to provide two discharge tubes that can be directed in a multitude of directions independent of one another.

A further object of the invention is to provide a control stick on each discharge tube, which is responsible for adjusting the air speed of the respective discharge tube via a valve located upstream of said respective discharge tube.

A further object of the invention is to provide a single throttle that is located on one of the control sticks, which controls the engine speed, and is thus responsible for the overall air speed that is provided to both discharge tubes irrespective of the valve positions.

These together with additional objects, features and advantages of the gas-powered dual-hosed blower will be readily apparent to those of ordinary skill in the art upon reading the following detailed description of presently preferred, but nonetheless illustrative, embodiments of the gas-powered dual-hosed blower when taken in conjunction with the accompanying drawings.

In this respect, before explaining the current embodiments of the gas-powered dual-hosed blower in detail, it is to be understood that the gas-powered dual-hosed blower is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the gas-powered dual-hosed blower.

It is therefore important that the claims be regarded as including such equivalent construction insofar as they do not depart from the spirit and scope of the gas-powered dual-hosed blower. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
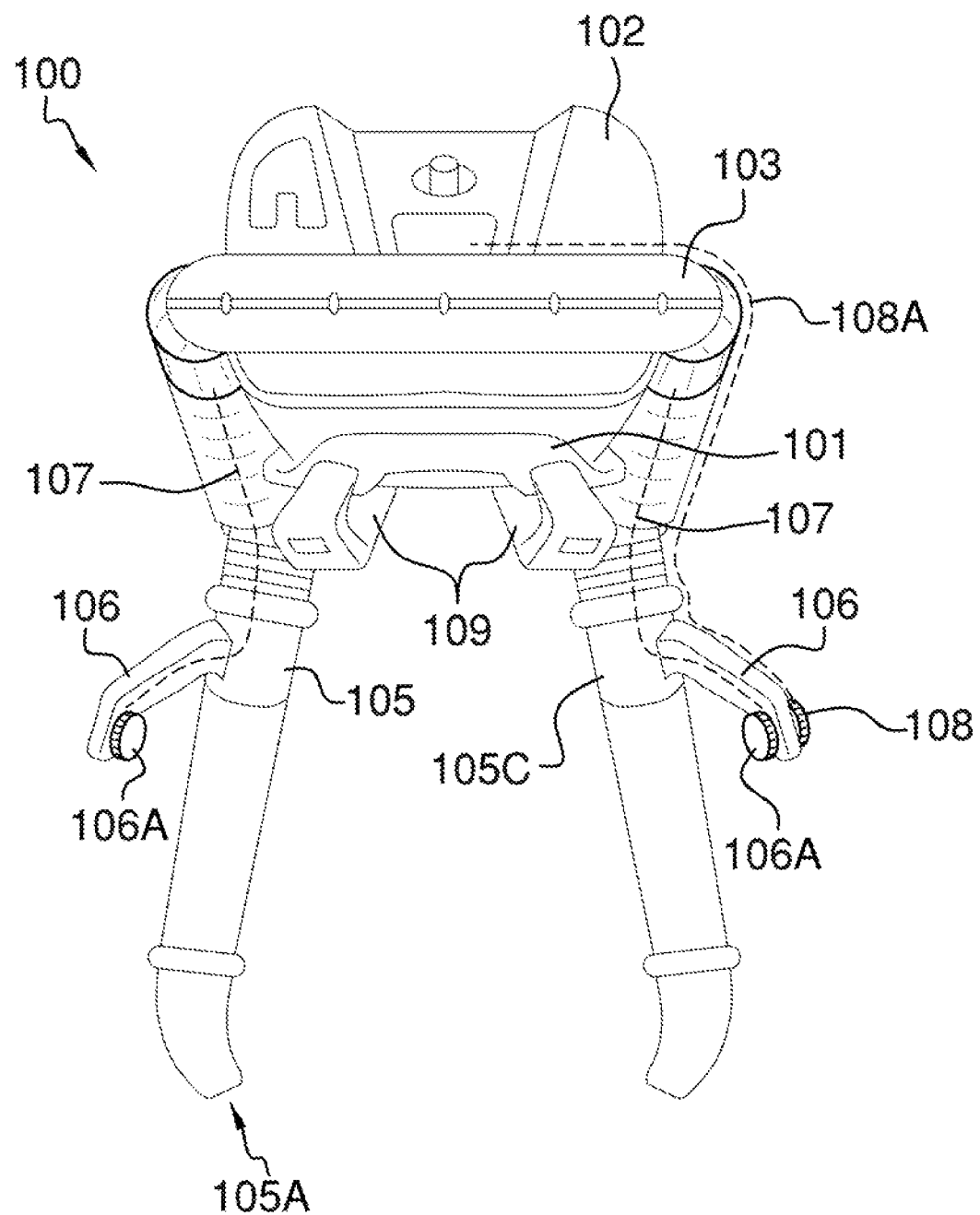
FIG. 1 illustrates a top view of the gas-powered dual-hosed blower in which broken lines are depicted on both discharge tubes to indicate the control lines required to adjust the valves of the respective discharge tubes.
Figure 2:
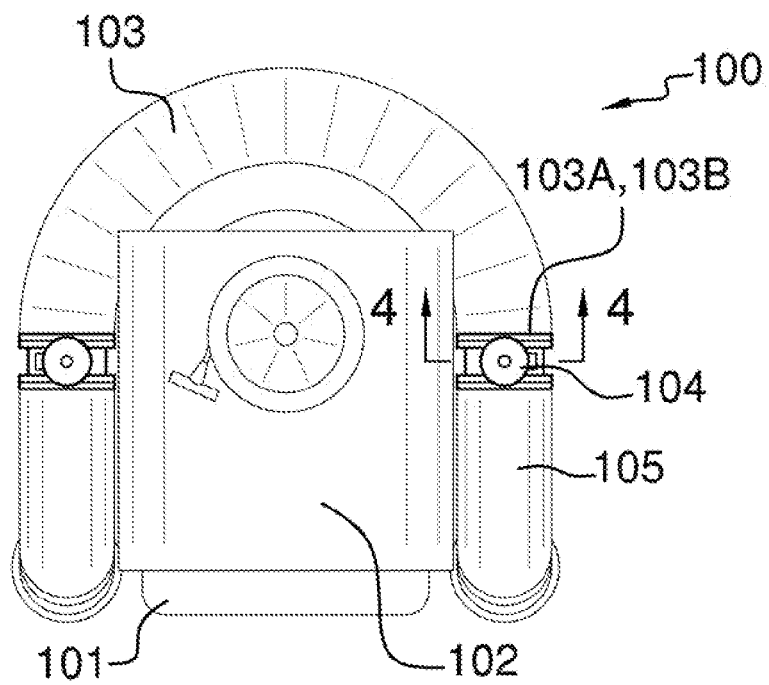
FIG. 2 illustrates a rear view of the gas-powered dual-hosed blower in which both valves are depicted on opposing sides of the blower.
Figure 3:
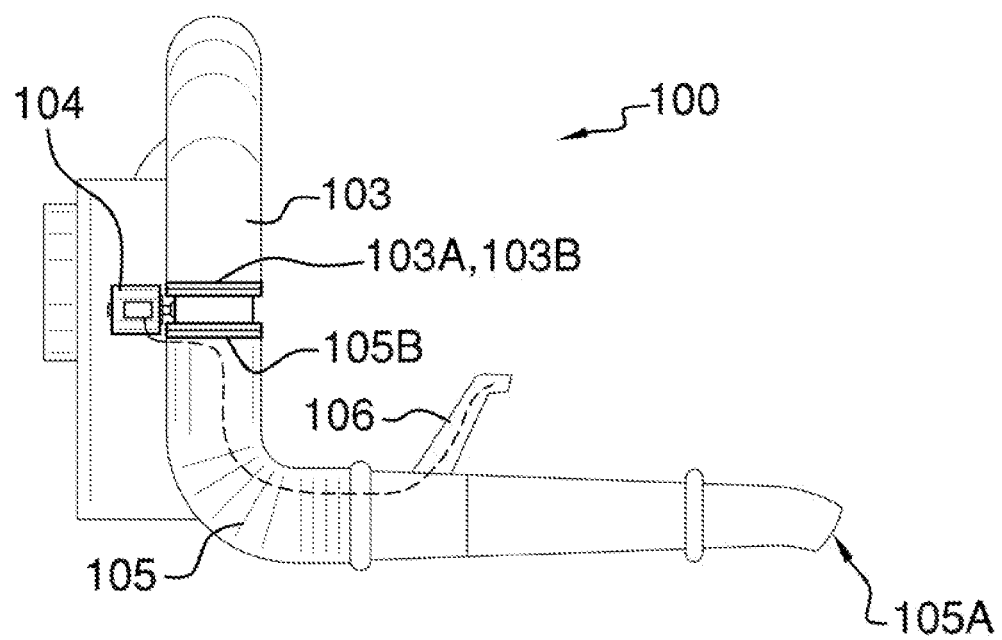
FIG. 3 illustrates a side view of the gas-powered dual-hosed blower wherein the control line of one discharge tube traverses from the respective control stick up to the valve located upstream and in between the blower output and the respective discharge tube.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A gas-powered dual-hosed blower 100 (hereinafter invention) includes a frame 101 that supports an engine 102 and a blower 103.

The blower 103 is unique to the invention 100 in that the blower 103 has two outputs 103A and 103B. Positioned at both outputs 103A and 103B are valves 104. The valves 104 can open or close to adjust air speed entering into a discharge tube 105.

The two discharge tubes 105 are of standard construction with respect to the field involving backpack-styled blowers, and provide the full range of flexibility that is associated therewith. The discharge tubes 105 each include a control stick 106 that is located on an exterior surface 105C of the discharge tube 105.

It shall be noted that the discharge tube 105 is further defined with an outlet 105A through which the accelerated air passes and is the genesis behind a blower. The discharge tube 105 also includes an inlet 105B, which is adjacent the valve 104 associated with the respective discharge tube 104.

The control stick 106 includes a valve knob 106A, which is connected to a control line 107. The control line 107 spans from the valve knob 106A to the respective valve 104, and adjusts the output of the valve 104.

Figure 4:
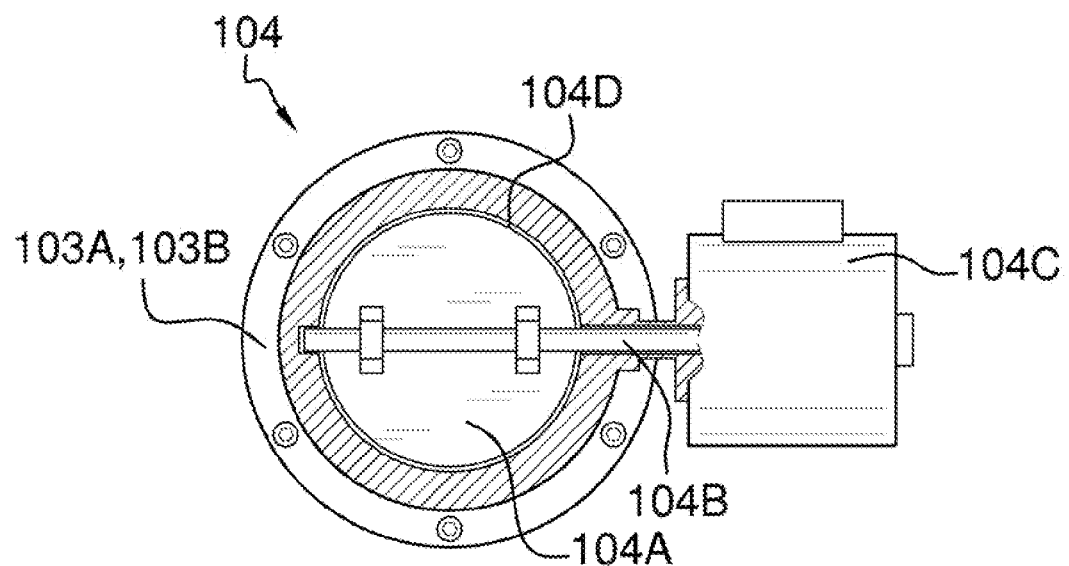
FIG. 4 illustrates a cross-sectional view of the valve along line 4-4 in FIG. 2, and depicting the valve in a closed position.
Figure 5:
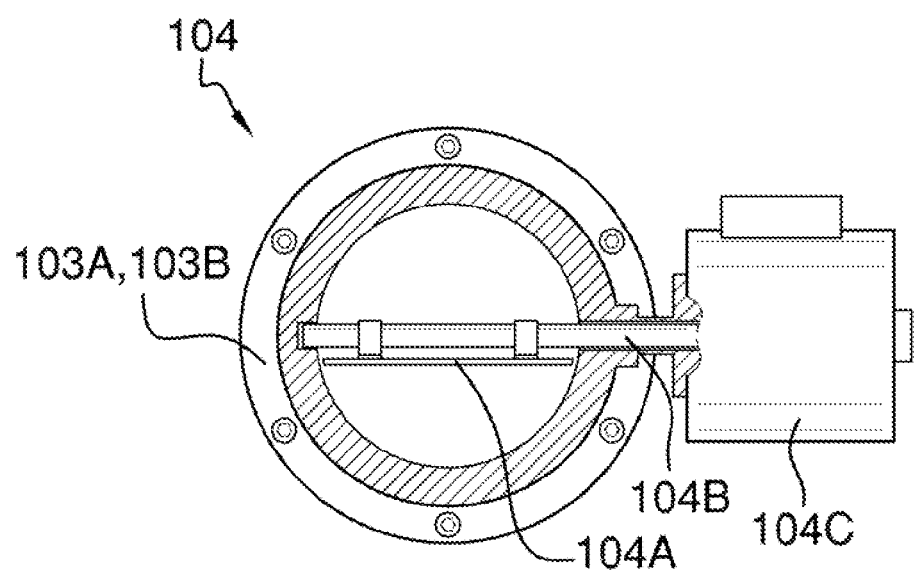
FIG. 5 illustrates a cross-sectional view of the valve along line 4-4 in FIG. 2, and depicting the valve in an open position.

It shall be noted that the term valve 104 is being used to describe a mechanically-operable device that can open and close in order to restrict the passage of a gas or fluid. The valves 104 depicted in FIGS. 4 and 5, are of the butterfly valve type, and comprise a butterfly valve surface 104A that is rotated upon an axle 104B, which is adjusted via a gearbox 104C that is adjacent the butterfly valve surface 104A. The gearbox 104C is controlled by the control line 107, which rotates the axle 104B a total of 90 degrees from either an open position (see FIG. 5) to a closed position (see FIG. 4), or vice versa.

The valve 104 includes a valve housing 104D that supports the butterfly valve surface 104A and the axle 104B.

The valve knobs 106A located on each control stick 106 enable the respective valves 104 to adjust the air speed that is transmitted down the discharge tube 105 and out the respective outlet 105A.

One of the control sticks 106 shall include a throttle 108 that includes a throttle line 108A that traverses to the engine 102, and controls the engine speed. The throttle 108 will only adjust the engine speed of the engine, which is in turn mechanically driving the blower 103. The output of the discharge tubes 105 is a function of both the engine speed and the particular setting of the respective valve 104.

The invention 100 is worn like a backpack pursuant to the backpack-styled straps 109, and is otherwise used and operated like a traditional backpack-styled blower. However, the inclusion of the two discharge tubes 105 and their respective valves 104 enables an end user to open and close the air flow to either discharge tube 105 independently, which is the main feature of the invention 100.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A gas-powered dual-hosed blower comprising:
    a back-pack styled blower that includes an engine mechanically driving a blower, which has two outputs; wherein a valve is located at each output of the blower and in turn connects to one of two discharge tubes;
    wherein each discharge tube includes a control stick that supports a valve knob so as to adjust the air speed of the respective discharge tube therefrom.

2. The gas-powered dual-hosed blower as described in claim 1 wherein the control sticks are located on an exterior surface of the discharge tubes.

3. The gas-powered dual-hosed blower as described in claim 1 wherein the discharge tube includes an inlet and an outlet; wherein the inlet is adjacent the respective valve.

4. The gas-powered dual-hosed blower as described in claim 1 wherein the valve knob is connected to a control line that spans from the control stick to the respective valve of the respective discharge tube.

5. The gas-powered dual-hosed blower as described in claim 4 wherein the valve is a butterfly valve that includes a butterfly valve surface rotated on an axle that is connected to a gearbox.

6. The gas-powered dual-hosed blower as described in claim 5 wherein the gearbox can rotate both the axle and the butterfly valve surface a total of 90 degrees from an open position to a closed position.

7. The gas-powered dual-hosed blower as described in claim 6 wherein the control line connects the gearbox of the respective valve to the valve knob.

8. The gas-powered dual-hosed blower as described in claim 4 wherein one of the control sticks includes a throttle and throttle line that extends from the control stick to the engine, and which controls the engine speed therefrom.

9. A gas-powered dual-hosed blower comprising:
  a back-pack styled blower that includes an engine mechanically driving a blower, which has two outputs; wherein a valve is located at each output of the blower and in turn connects to one of two discharge tubes;
  wherein each discharge tube includes a control stick that supports a valve knob so as to adjust the air speed of the respective discharge tube therefrom;
  wherein the discharge tube includes an inlet and an outlet; wherein the inlet is adjacent the respective valve;
  wherein the valve knob is connected to a control line that spans from the control stick to the respective valve of the respective discharge tube.

10. The gas-powered dual-hosed blower as described in claim 9 wherein the control sticks are located on an exterior surface of the discharge tubes.

11. The gas-powered dual-hosed blower as described in claim 9 wherein the valve is a butterfly valve that includes a butterfly valve surface rotated on an axle that is connected to a gearbox.

12. The gas-powered dual-hosed blower as described in claim 11 wherein the gearbox can rotate both the axle and the butterfly valve surface a total of 90 degrees from an open position to a closed position.

13. The gas-powered dual-hosed blower as described in claim 12 wherein the control line connects the gearbox of the respective valve to the valve knob.

14. The gas-powered dual-hosed blower as described in claim 9 wherein one of the control sticks includes a throttle and throttle line that extends from the control stick to the engine, and which controls the engine speed therefrom.

15. A gas-powered dual-hosed blower comprising:
  a back-pack styled blower that includes an engine mechanically driving a blower, which has two outputs; wherein a valve is located at each output of the blower and in turn connects to one of two discharge tubes;
  wherein each discharge tube includes a control stick that supports a valve knob so as to adjust the air speed of the respective discharge tube therefrom;
  wherein the discharge tube includes an inlet and an outlet; wherein the inlet is adjacent the respective valve;
  wherein the valve knob is connected to a control line that spans from the control stick to the respective valve of the respective discharge tube;
  wherein one of the control sticks includes a throttle and throttle line that extends from the control stick to the engine, and which controls the engine speed therefrom.

16. The gas-powered dual-hosed blower as described in claim 15 wherein the control sticks are located on an exterior surface of the discharge tubes.

17. The gas-powered dual-hosed blower as described in claim 15 wherein the valve is a butterfly valve that includes a butterfly valve surface rotated on an axle that is connected to a gearbox.

18. The gas-powered dual-hosed blower as described in claim 17 wherein the gearbox can rotate both the axle and the butterfly valve surface a total of 90 degrees from an open position to a closed position.

19. The gas-powered dual-hosed blower as described in claim 18 wherein the control line connects the gearbox of the respective valve to the valve knob.

* * * * *